United States Patent [19]
Bach et al.

[11] Patent Number: 5,960,788
[45] Date of Patent: Oct. 5, 1999

[54] COLLAPSIBLE PORTABLE OUTDOOR FIREPLACE

[75] Inventors: Kent Bach, Bensenville; Jeffrey Grady, Naperville, both of Ill.; Richard Smith, Broken Arrow, Okla.

[73] Assignee: Fleming Sales Company, Addison, Ill.

[21] Appl. No.: 09/129,933

[22] Filed: Aug. 6, 1998

[51] Int. Cl.$^6$ ........................................... F24B 1/182
[52] U.S. Cl. ...................... 126/506; 126/519; 126/276
[58] Field of Search .................... 126/519.29, 9 R, 126/304 R, 9 B, 306, 30, 25 R, 506, 276

[56] References Cited

U.S. PATENT DOCUMENTS

| | | | |
|---|---|---|---|
| D. 192,491 | 3/1962 | Crownover | D1/7 |
| D. 200,137 | 1/1965 | Hanna | D81/10 |
| D. 284,929 | 8/1986 | Schlosser et al. | D7/332 |
| D. 293,191 | 12/1987 | Stephen et al. | D7/332 |
| D. 318,327 | 7/1991 | Sorensen | D23/348 |
| D. 375,347 | 11/1996 | Whalen et al. | D23/317 |
| 1,279,033 | 9/1918 | Stollberg | 126/25 R |
| 3,220,400 | 11/1965 | Yager | 126/6 |
| 3,455,291 | 7/1969 | Glass | 126/137 |
| 3,499,432 | 3/1970 | Hannebaum | 126/120 |
| 3,809,058 | 5/1974 | Becker | 126/120 |
| 4,112,913 | 9/1978 | Shimek | 126/120 |
| 4,167,177 | 9/1979 | Wiggins | 126/121 |
| 4,210,118 | 7/1980 | Davis et al. | 126/25 R |
| 4,216,760 | 8/1980 | Wiggins | 126/120 |
| 4,363,313 | 12/1982 | Smith | 126/9 R |
| 4,492,215 | 1/1985 | DiFianvittorio | 126/9 R |
| 4,498,452 | 2/1985 | Schlosser et al. | 126/9 R |
| 4,553,525 | 11/1985 | Robue | 126/30 |
| 4,706,817 | 11/1987 | Great House | 206/545 |
| 5,094,223 | 3/1992 | Gonzalez | 126/25 R |
| 5,318,322 | 6/1994 | Home | 280/645 |
| 5,529,053 | 6/1996 | Carter et al. | 126/25 R |
| 5,596,980 | 1/1997 | Whalen et al. | 126/519 |
| 5,598,834 | 2/1997 | Grady | 126/506 |
| 5,720,272 | 2/1998 | Chiang | 126/25 R |
| 5,832,915 | 11/1998 | Skidmore et al. | 126/9 R |
| 5,836,298 | 11/1998 | Grady | 126/506 |

FOREIGN PATENT DOCUMENTS

| | | | |
|---|---|---|---|
| 397287 | 8/1933 | Germany . | |
| 2916090 | 10/1979 | Germany | A47J 37/07 |

OTHER PUBLICATIONS

Whalen Manufacturing, Whalen Firepit brochure, Jan. 1994.
"Backyard Max Installation Instructions", GSW approx. Mar. 1994.
Coleman Outdoor Fireplace Assembly & Instruction Manual, Coleman Manufacturing date obtain: Sep.

*Primary Examiner*—James C. Yeung
*Attorney, Agent, or Firm*—Vedder, Price, Kaufman & Kammholz

[57] ABSTRACT

A collapsible, portable outdoor fireplace with a fire screen assembly is easily broken down into its constituent components, which are stored in a cavity between the top and bottom cover members of the fireplace. The fireplace includes hemispherical top and bottom fire bowl members and a fire screen assembly that is supported between the two fire bowl members. The fire screen assembly matches the configuration of the bowl members and includes a series of individual screen panels that are easily assembled together and disassembled without the need for tools. One of the screen panels includes an access door that defines an entrance to the fireplace.

20 Claims, 5 Drawing Sheets

COLLAPSIBLE PORTABLE OUTDOOR FIREPLACE

BACKGROUND OF THE INVENTION

The present invention generally relates to portable fireplaces, and more particularly, to a collapsible portable outdoor fireplace having components that may be taken apart and placed within top and bottom members of the fireplace for storage.

Fixed outdoor fireplaces, such as those made from brick, masonry and the like have been known for years. Portable outdoor fireplaces have recently entered the marketplace and have evidenced a distinct popularity. The size of these portable fireplaces is small and their structures are such that they permit them to be easily moved from one location to the other. Such fireplaces are found in the patent literature in U.S. Design Pat. No. 293,191, issued Dec. 15, 1987, U.S. Pat. No. 5,094,223 issued Mar. 10, 1992 and U.S. Pat. No. 5,590,980, issued Jan. 28, 1997.

The U.S. Design Pat. No. 293,191 describes a portable outdoor fireplace which incorporates the top and bottom covers of the well-known Weber "Kettle" grill spaced apart by an internal framework that defines a fire pit area. The internal framework must be removed to close the top and bottom covers together. No provision is made for storing the internal framework within the top and bottom covers, and hence these fireplaces require a large area for storage.

Another outdoor fireplace is described in U.S. Pat. No. 5,596,980, issued Jan. 28, 1997 that is similar to the structure shown in the aforementioned U.S. Design Pat. No. '191 but which further includes a functional fire screen assembly in which a plurality of screens are fixed within a cylindrical frame assembly. This frame assembly includes top and bottom ring members that are spaced apart by columns. The fire screen assembly is large and must be removed and stored separately from the top and bottom covers. This fireplace cannot be easily disassembled and stored in a minimum amount of space because the internal framework of it cannot be easily disassembled.

The prior art therefore lacks a collapsible portable outdoor fireplace having a fire screen assembly in which the free screen assembly may be disassembled and stored between the top and bottom cover members in a manner such that the disassembled fireplace takes up a minimum amount of space for storage.

SUMMARY OF THE INVENTION

The present invention is directed to a portable outdoor fireplace of a collapsible nature having a fire chamber defined between top and bottom cover members, a vertical fire screen assembly supported on the bottom cover member and extending vertically between the top and bottom cover members, wherein the fire screen assembly may be easily disassembled into singular components that may be stored within the top and bottom cover members.

It is therefore a general object of the present invention to provide a collapsible fireplace that is suitable for outdoor use that may be easily assembled and disassembled.

It is yet another object of the present invention to provide a portable outdoor fireplace having a "knock-down" nature wherein the fireplace includes opposing base and cover portions, a fire screen assembly separating the base and cover portions and extending upwardly from the base portion to support the cover portion, the fire screen assembly including a plurality of fire screen panels assembled together to define an enclosed fire pit area therewithin, the fire screen panels being easily disassembled and having a curvature such that they may be stored between the top and bottom cover members, the fireplace further including means for retaining the top and bottom cover members engaged together.

A still further object of the present invention is to provide a collapsible portable outdoor fireplace having a fire bowl enclosed by a circular fire screen assembly, the fire screen assembly including a plurality of screens, each having a supporting frame affixed thereto, the screens engaging one another to define the fire screen assembly, one of the screens having a door hingedly mounted thereto, each of the screens being easily detachable from each other, the fire bowl including hemispherical top and bottom bowl members having perimeters that engage each other, and the fireplace further including a wheeled undercarriage, the fire screen assembly and undercarriage being easily disassembled and stored within the fire bowl between the top and bottom members thereof.

The present invention accomplishes these objects in accordance with one principal aspect thereof by utilizing a pair of opposing, top and bottom hollow, bowl members that serve as respective cover and base portions of the fireplace. A fire screen assembly is supported vertically between the two portions in order to provide a barrier for the fireplace which retains burning embers and other burning material within the fire screen and in the bottom bowl. The fire screen assembly includes a plurality of individual screen panels that detachably engage each other, and one of the screen panels includes a door hingedly mounted thereon. Each of the fire screen panels has a defined curvature that permits it to be stored between the top and bottom bowls of the fireplace.

In another principal aspect of the present invention, the portable outdoor fireplace is easily collapsible without the need of hand tools. In particular, the fire screen assembly utilizes connecting members that connect the screen panels together and these connecting members may be manipulated easily by hand. This aspect of the present invention enables the portable outdoor fireplace of the present invention to be assembled, used, and disassembled without the requirement of tools.

In yet another principal aspect of the present invention, the base portion of the fireplace includes a deep, and preferably concave, bowl portion that may accommodate the individual components of the fireplace when disassembled. As exemplified in the preferred embodiment, the base bowl portion is formed with a specific configuration having a series of grooves formed therein that position and receive legs of the wheeled undercarriage of the fireplace.

In yet another principal aspect of the present invention and is exemplified by the preferred embodiment, the top and bottom bowls include respective corresponding outer rims that engage the top and bottom perimeters of the fire screen assembly. The two bowl members may further preferably include engagement members for engaging the edges of the two bowl members to maintain the two bowl members in a closed position and to reliably retain the fire screen and undercarriage components stored therebetween.

These and other objects, features and advantages of the present invention will be clearly understood through a consideration of the following detailed description.

BRIEF DESCRIPTION OF THE DRAWINGS

In the course of this detailed description, the reference will be frequently made to the attached drawings in which.

DETAILED DESCRIPTION OF THE PREFERRED EMBODIMENTS

Figure 1:
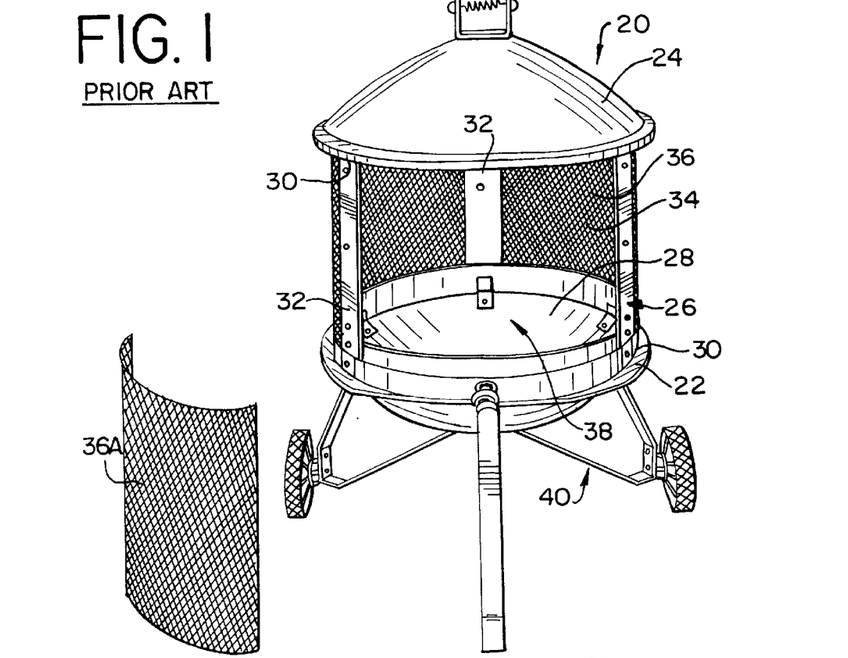
FIG. 1 is a perspective view of a known outdoor fireplace.

FIG. 1 illustrates a portable outdoor fireplace 20 of a known type sold under the trade name "Firepit" that is representative of prior art outdoor fireplace constructions, and which is described in detail in U.S. Pat. No. 5,596,980, issued Jan. 28, 1997. This prior art fireplace 20 has a bottom base member 22 that supports a vertical fire screen structure 26 between the bottom base member 22 and the top cover member 24. The fire screen structure forms a fire chamber 28 of the fireplace 20. As mentioned in the aforementioned U.S. Pat. No. '980, the fire screen structure 26 is a complex structure, and includes top and bottom support rings 30 that are interconnected by vertical columns 32 that define a series of curved slots 34 between the support rings 30 and risers 32. These slots 34 each receive a curved screen panels 36 to complete the enclosure of the fire screen structure. In order to introduce combustible material into the fireplace while the top cover member 24 is in place, one of the screen panels 36A may be removed from its corresponding slot 34. However, as mentioned in the U.S. Pat. No. '980, the removed screen panel must be stored away from the fireplace. The fire screen structure of this known fireplace 20 is practically permanent and is not intended to be stored within fireplace. Despite its wheeled undercarriage 40, the fireplace 20 is cumbersome to transport from place to place.

The present invention provides a solution to the aforementioned transport and storage problem. A portable, collapsible outdoor fireplace constructed in accordance with the principles of the present invention is illustrated generally at 50 in FIG. 2. The collapsible fireplace 50 includes opposing top and bottom hollow members 52, 53, illustrated in the drawings as hemispherical bowl members. The bottom member 53 serves as a base of the fireplace 50 to which is attached a wheeled undercarriage 54 that facilitates transport of the fireplace 50 when assembled, and the bottom member 53 also supports a fire screen assembly 56 that defines an interior fire chamber 58 of the fireplace 50.

Figure 5:
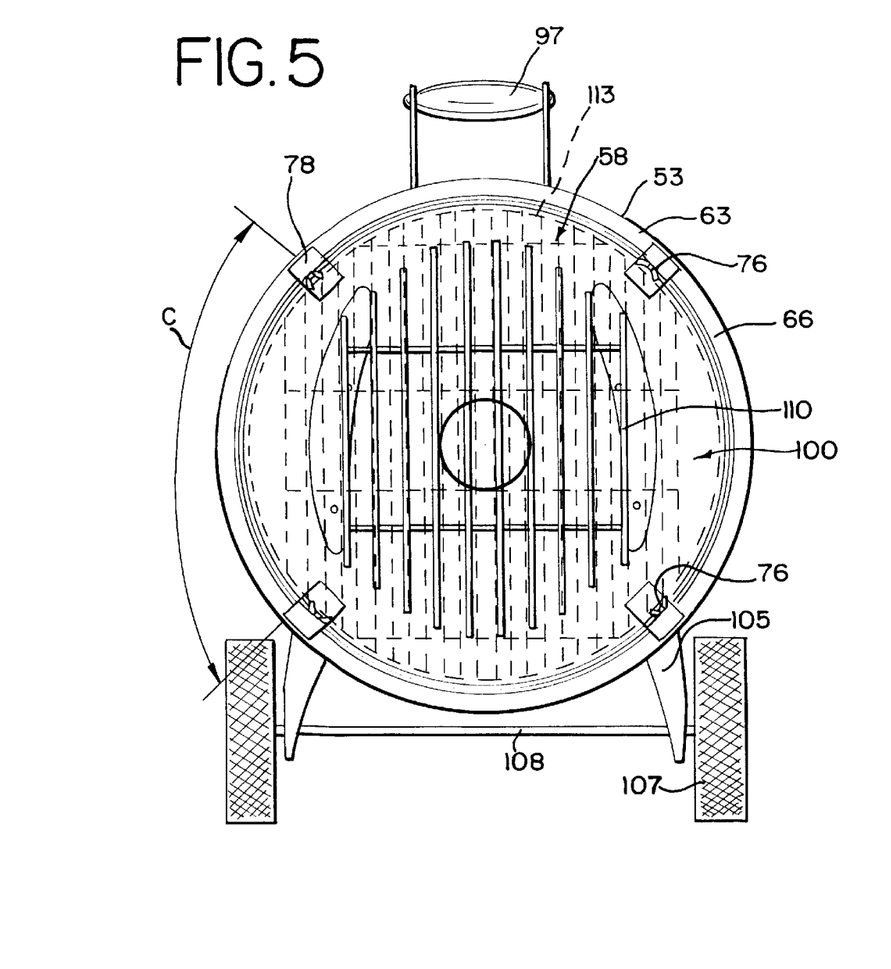
FIG. 5 is a top plan view of the fireplace of FIG. 2, with the top bowl member removed for clarity, but illustrating the internal fire grate and fire screen assembly in place thereon.
Figure 6:
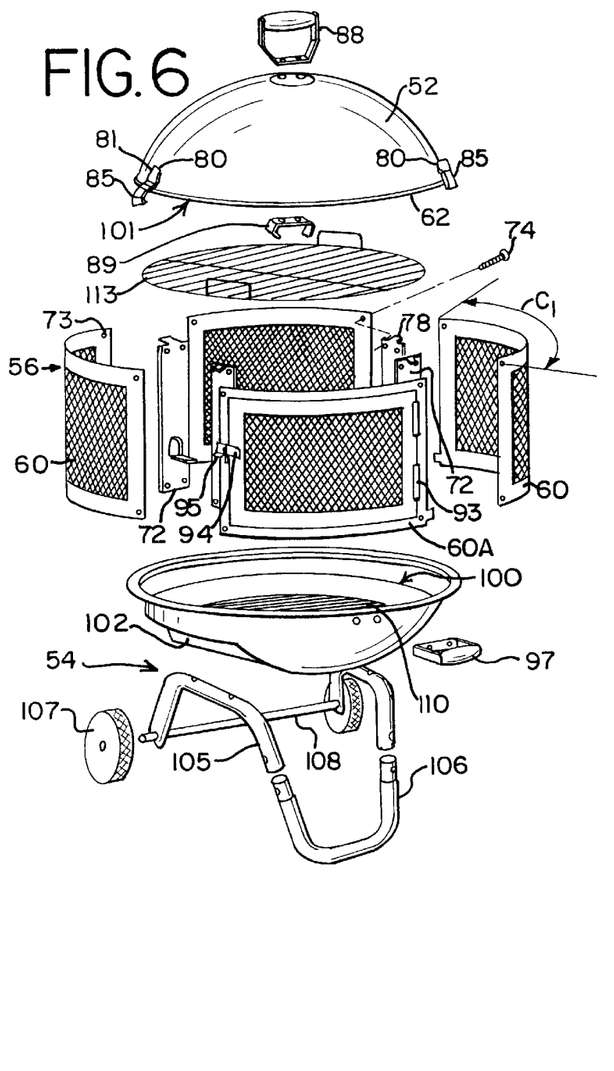
FIG. 6 is an exploded perspective view of the fireplace of FIG. 2.
Figure 7:
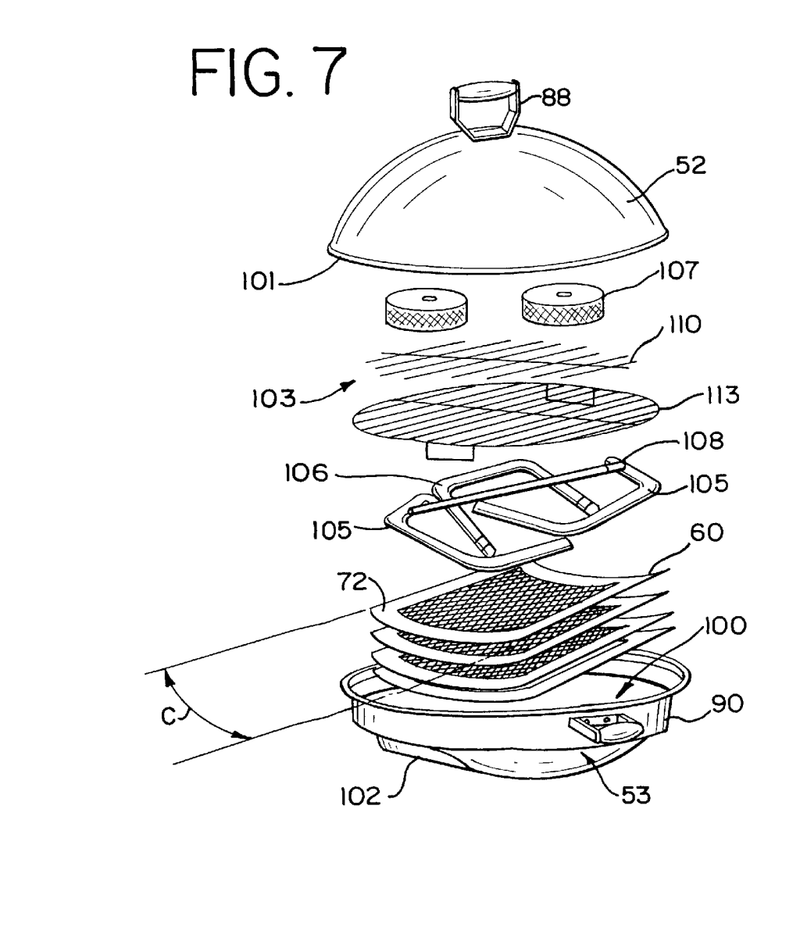
FIG. 7 is an exploded view of the fireplace of FIG. 2; illustrating how the components thereof are stored between the top and bottom members for storage.

It will be understood that particular configurations of the fire chamber 58 illustrated, i.e., the circular perimeter and hemispherical configuration of the top and bottom members 52, 53 and the cylindrical configuration of the fire screen assembly 56 are for purposes of example only and that other suitable configurations, such as a rectangular, square, oval, to name a few may be utilized with the present invention. The fire screen assembly 56 includes a plurality of individual screen panels 60 each of which is illustrated in the drawings as having a central screen portion 61 and an outer frame portion 64 that extends around the perimeter of its associated central screen portion 61. Each of the individual screen panels, as best illustrated in FIGS. 5–7, has a predetermined curvature having an arc length of C and each of the screen panels 60 are flexible enough so that they may be flexed to demonstrate a sharper curvature $C_1$ when assembled with the other screen panels 60.

Figure 9:
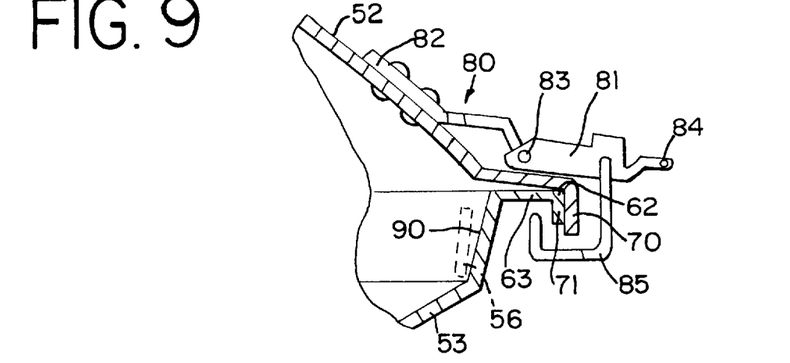
FIG. 9 is an enlarged, sectional view of the top and bottom members of the fireplace of FIG. 2, illustrating in detail the latch mechanism for engaging the two members together in an unlatched and untensioned condition.
Figure 10:
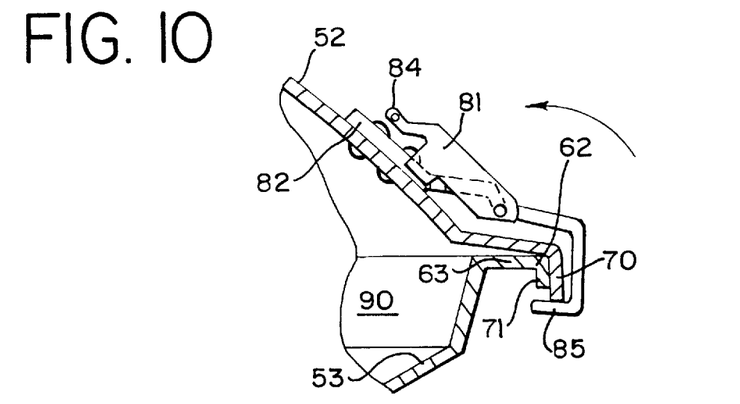
FIG. 10 is the same view as FIG. 9, but illustrating the latch mechanism in a latched and tensioned condition; and, FIG. 11 is a perspective view similar to FIG. 4 but with the undercarriage stored in the cavity between the two members.
Figure 11:
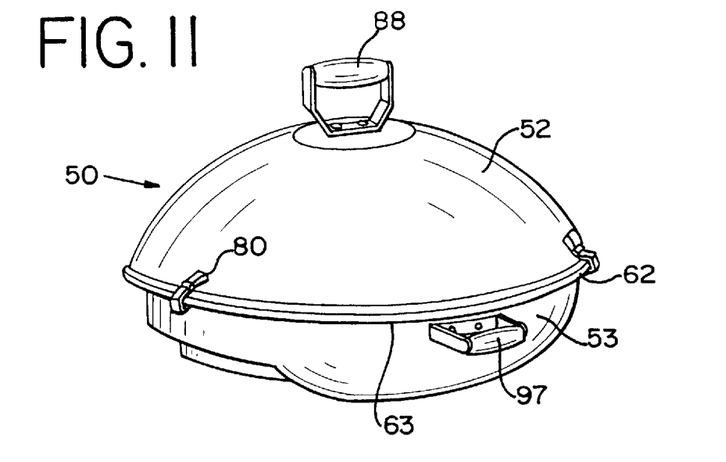

The top member 52 has a shape that is similar to that of the bottom member and preferably has the same perimeter configuration, shown as a diameter, as that of the bottom member 53. As best illustrated in FIGS. 9 & 10, each of the top and bottom members 52, 53 may further include an outer rim, or edge 62, 63 that respectively extend outwardly therefrom in order to surround the respective top and bottom ends 66, 67 of the fire screen assembly 56. As can be seen in FIG. 9, the top member outer edge 62 extends radially outwardly and preferably terminates in a downwardly extending flange 70. The bottom member outer edge 63 also extends radially outwardly to a point just slightly less than the diameter of the top member 52 and its outer edge 62 so as to fit within the interior space that is partly defined by the downwardly extending flange 70. The bottom member outer edge 63 also terminates in a downward flange 71 as shown that lies adjacent the top member flange 70. This relationship permits the top member 52 to properly seat itself on the bottom member 53 when the fireplace is disassembled.

As will be explained in greater detail below, the diameters of the top and bottom members 52, 53 are closely related such that the top member 52 may be used to close off the fire chamber 58 when the fire screen assembly 56 is removed to cut off the flow of air to combustible material present in the fire chamber 58. A handle assembly 88 is provided for ease in moving the top member 52. More importantly, the top and bottom members 52, 53 will engage each other for transport of the fireplace 50 in a disassembled, or "knocked-down" condition. An internal clip or hanger 89 may also be provided with the top member 52 to hang the top member 52 on the side of the fireplace 50.

Figure 2:
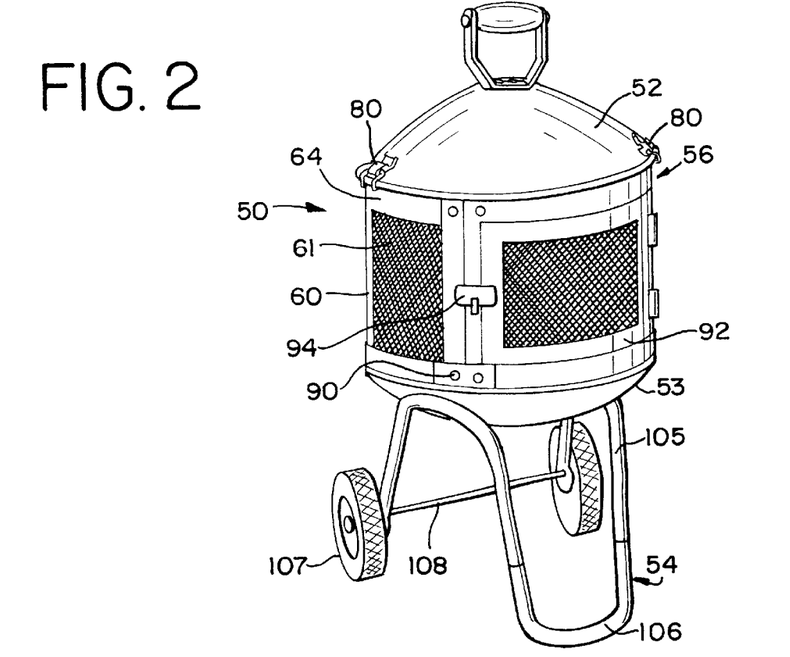
FIG. 2 is a front perspective view of a collapsible outdoor fireplace constructed in accordance with the principles of the present invention.
Figure 3:
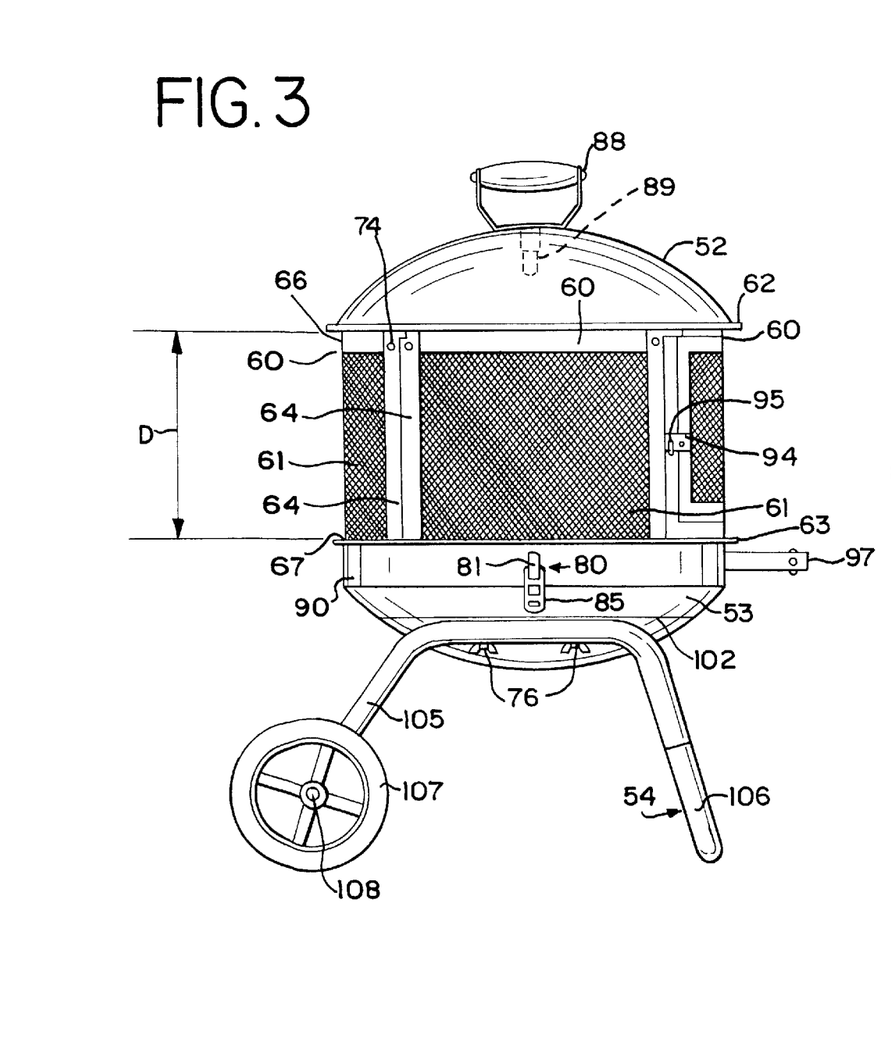
FIG. 3 is a side elevational view of the fireplace of FIG. 2.
Figure 4:
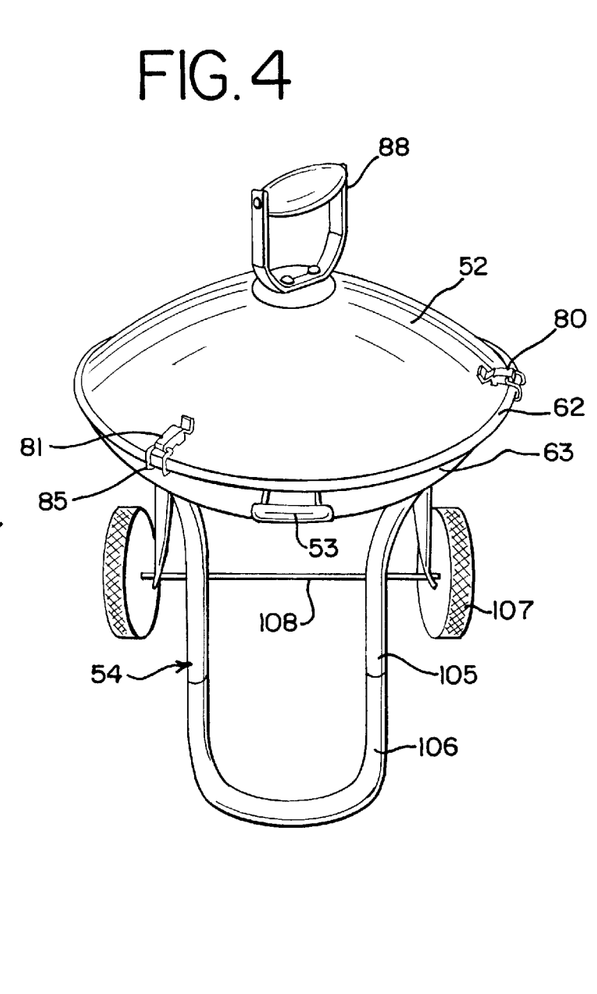
FIG. 4 is a perspective view of the fireplace of FIG. 2, in a partially collapsed condition, but with its wheeled undercarriage in place.

In order to facilitate storage and transport of the fireplace 50 in a knocked-down condition, a series of engagement members 80 are provided and may be located on the top member 52 as illustrated in FIGS. 2 and 4, or on the bottom member 53 as illustrated in FIG. 3. These engagement members 80 are preferably spaced at equal intervals around the perimeter of either of the top or bottom members 52, 53. In the preferred embodiment illustrated, and as specifically illustrated in FIGS. 9 and 10, the engagement members 80 are shown as including manipulatable latch members 81 mounted to the top member 52 via corresponding base plates 82. The latch members 81 are hinged or pivoted to the base plates movable around pivot points 83 by grasping lever ends 84 thereof. At the ends opposite the lever portion 84, the latch members 81 include U-shaped hooks 85, also pivotally mounted, that extend around, over and above the opposing outer rims 62, 63 of wherever the top or bottom member 52, 53 opposes the hooks 85, depending whether the latch members 81 are positioned on the top or bottom members 52, 53. The hooks 85 engage the outer edges 62, 63 and exert a clamping pressure, when tensioned, to hold them (and the attached top and bottom members 52, 53) when the latches are manipulated to their closed position as illustrated in FIG. 10. This manipulation imposes tension on the hooks 85, which in turn grip the outer edges 62, 63 of the top and bottom members 52, 53.

The fire screen assembly, as mentioned above, includes a plurality of individual screen panels 60, each of which is partly curved. The screen panels 60 are designed to be engageable with each other and with a like plurality of upright posts 72. These posts 72 and the screen panels 60 are preferably provided with a plurality of pre-drilled holes 73 that accommodate bolts 74. The bolts 74 secure the components together and are secured by wing nuts 76 so that a user of the fireplace need not necessarily utilize tools to assemble and disassemble the fireplace 50 together.

When assembled, the screen panels 60 and posts 72 define a cylindrical fire screen assembly 56 that is supported within the bottom bowl member 53. In this regard, the bottom member 53 preferably has a cylindrical skirt wall portion 90 that extends around the perimeter thereof and underneath the outer edge 63 thereof. This skirt wall 90 assists in supporting and stabilizing the fire screen assembly 56 in the bottom member inasmuch as the overall diameter of the fire screen assembly 56 is preferably slightly less than the inner diameter of the skirt wall portion 90. In order to support the top member 52 of the fireplace 50, the posts 72 may be provided with tabs, or legs 78 that extend radially outwardly near the top of the screen panels 60. These tabs 78 will fit under the top member outer edge 62 and within the flange portion 70 thereof so that the top cover 52 will reliably rest on the tabs 78.

Figure 8:
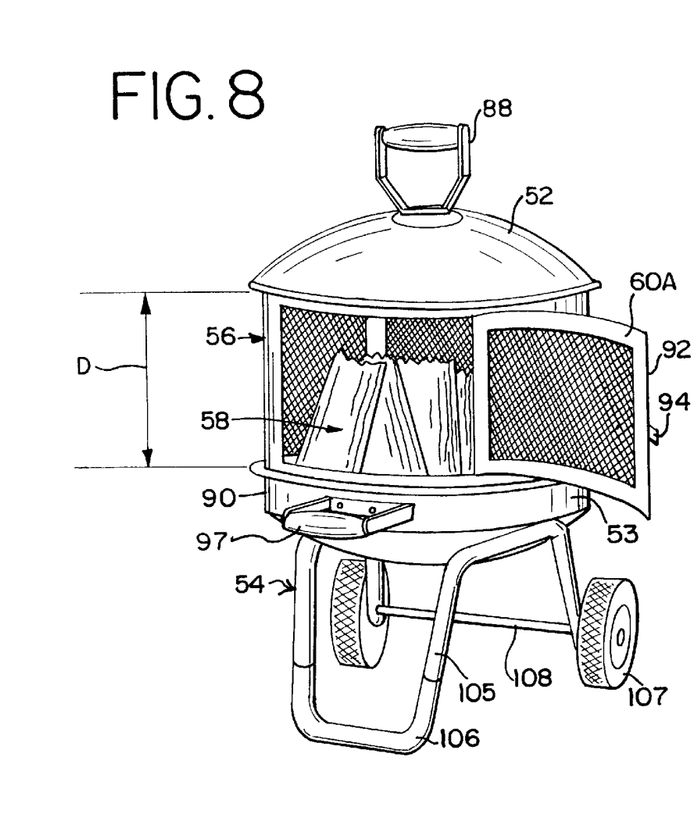
FIG. 8 is a perspective view of the fireplace of FIG. 2, with the door open for clarity to display the interior of the fire chamber.

One of the screen panels 60a provides a point of access to the fire chamber 58. This screen panel 60A includes a screened door 92 attached thereto. As best illustrated in FIG. 6. The door 92 is hinged at one end 93 to the outer frame 64A of the panel 60A. The other end of the door includes a movable latch 94 that engages a clasp 95 on the screen panel 60A. The height of the door 92 is less than the distance D between the top and bottom members 52, 53 when the fire screen assembly 56 is in place. (FIG. 8.)

In an important aspect of the invention, the bottom member 53 is provided with a deep internal cavity 100 of sufficient depth to accommodate most, if not all, of the components of the fireplace 50 and especially the fire screen assembly 56. In such a condition, the fireplace appears as illustrated in FIG. 4 where the undercarriage 54 remains in place so that the fireplace 50 may be easily moved using its wheels 107. A handle 97 may be provided at the front of the fireplace 50 along the skirt wall 90 to facilitate movement. In this regard, the bottom member 52 includes a somewhat hemispherical portion 101 that extends beneath the skirt wall 90 thereof. This cavity 100 cooperates with the cavity 101 of the top member 52 to form a major cavity 103 that accommodates all of the components of the fireplace 50, as illustrated best in FIG. 7. Two elongated recesses 102 may be formed in the bottom member to receive the upper portions of the undercarriage 54 and specifically, the leg portions 105 thereof.

The recesses 102 serve to position the legs 105 with respect to each other and with respect to the bottom member 53. The legs 105 and recesses 102 are drilled to accommodate bolts 74 and wing nuts 76 that securely attached the undercarriage 54 to the bottom members 53. In order to facilitate the knock-down aspect of the fireplace 50, the undercarriage 54 also includes a tubular U-shaped bight portion 106 that interconnects the legs 105 together by telescopingly engaging the same. Conventional wheels 107 are mounted on an axle 108 that extends through the leg portions 105.

In order to store and transport the fireplace 50 with a minimum of space, the individual components thereof may be stored in the major interior cavity 103 defined by the bottom member cavity 100 and the top member cavity 101. This interior storage space accommodates the screen panels 60, their associated parts 72, the leg portions 105, bight portion 106, axle 108 and wheels 107 may be easily disassembled and retained within the interior of the two members 52, 53. A grate 110 is preferably provided that is supported upon the tops of the bottom member recesses 102.

In another aspect of the present invention, the fireplace may be easily converted into a cooking grill. FIGS. 5 and 6 are illustrative of this concept. A cooking grill 113, having a diameter larger then the burning grate 110 is supported above the base member 53 and the grate 110 by way of a series of tabs formed on the fire screen assembly posts 72. The fuel used for the fireplace 50 will provide a heat source for cooking food atop the grill 113.

While the preferred embodiments of the invention have been shown and described, it will be apparent to those skilled in the art that changes and modifications may be made therein without departing from the spirit of the invention, the scope of which is defined by the appended claims. For example, the depths of the interior cavities of the top and bottom members 52, 53 may be increased or decreased, and other configurations may be incorporated.

We claim:

1. A portable outdoor fireplace, comprising:
    a base member for supporting and burning combustible material therein, the base member having an outer edge of a predetermined configuration;
    a collapsible fire screen assembly supported by said base member, said fire screen defining a fire chamber which contains and substantially encloses said combustible material within said base member, said fire screen assembly including a plurality of individual screen panels that are engaged upon said base member to define said fire screen assembly, said screen panels being capable of being disassembled into said individual screen panels;
    a cover member for covering said fire screen, said cover member also having an outer edge of the same configuration as that of said base member outer edge;,
    at least two engagement members disposed on one of said base and cover members for engaging said base and cover members together;
    a collapsible wheeled undercarriage that supports said base member off the ground and which is capable of disassembly; and,
    at least one of said base and cover members having a hollow cavity formed therein of sufficient depth for storing said fire screen assembly and said undercarriage when said screen panels and said undercarriage are disassembled.

2. The portable outdoor fireplace as defined in claim 1, further including a grill member and said fire screen assembly includes support for supporting said grill within said fire chamber at a chosen level above said base member.

3. The portable outdoor fireplace as defined in claim 1, wherein one of said screen panels includes a door for entry to said fire chamber from outside of said fireplace.

4. The portable outdoor fireplace as defined in claim 1, wherein said fire screen assembly includes a series of support posts to which said screen panels are engaged.

5. The portable outdoor fireplace as defined in claim 4, wherein said posts and said screen panels are detachably engaged together by bolts and wing nuts.

6. The portable outdoor fireplace as defined in claim 1, wherein said cover member includes a handle for easy transport of said fireplace when said members are engaged.

7. The portable outdoor fireplace as defined in claim 1, wherein said fire screen assembly is generally cylindrical and said base and cover members have generally circular outer edges.

8. The portable outdoor fireplace as defined in claim 1, wherein said base and cover members are hemispherical in configuration.

9. The portable outdoor fireplace as defined in claim 1, wherein said engagement members include manipulatable latch members affixed to said cover member, the latch member having extendible hooks that engage said base member proximate to said base member outer edge.

10. The portable outdoor fireplace as defined in claim 1, wherein said engagement members include manipulatable latch member affixed to said base member, the latch members having extendible hooks that engage said cover member proximate to said cover member outer edge.

11. The portable fireplace as defined in claim 1, wherein said wheeled undercarriage includes two tubular leg members and a tubular bight member interconnecting the leg members at one end of said undercarriage, said leg members each rotatably supporting a wheel at an opposite end of said undercarriage.

12. The portable outdoor fireplace as defined in claim 11, wherein said base member includes two recesses formed therein that receive portions of said leg member therein.

13. An outdoor fireplace, comprising:
a hollow, bottom fire bowl member for supporting and burning a combustible material therein, the bottom bowl member having an interior space defined by an outer edge with a preselected perimeter;
a screened enclosure supported by and extending upwardly from said bottom bowl member, said screened enclosure defining a fire chamber for containing said combustible material in place within said bottom bowl member, said screened enclosure including a plurality of distinct screen panels assembled together to define said screened enclosure, said screen panels being disengageble from each other in order to disassemble said screened enclosure;
a hollow, top fire bowl member for covering said screened enclosure, the top fire bowl member having an interior space defined by an outer edge having a perimeter that matches the perimeter of said bottom fire bowl member, said top fire bowl member being supported by said screened enclosure above and spaced away from said bottom fire bowl member; and,
a collapsible undercarriage for supporting said bottom fire bowl member off the ground, said undercarriage being detachable from said bottom fire bowl member, said top and bottom fire bowl members being engageable with each other along their respective perimeters when said screened enclosure is removed such that said top and bottom fire bowl member interior spaces cooperatively define a major interior storage cavity therebetween of sufficient size to store said screen panels of said screened enclosure when disassembled and to store said undercarriage when detached from said bottom fire bowl member.

14. The outdoor fireplace of claim 13, further including at least two engagement members disposed on exterior surfaces of one of said top and bottom fire bowl members for engaging said top and bottom fire bowl member outer edges together.

15. The outdoor fireplace of claim 13, wherein said bottom fire bowl member is generally hemispherical in configuration and includes a vertical skirt wall extending therearound for stabilizing said screened enclosure in place upon said bottom fire bowl member.

16. The outdoor fireplace of claim 13, wherein one of said screen panels includes a latchable door hingedly mounted thereto for gaining entry to said screened enclosure.

17. The outdoor fireplace of claim 13, wherein said screened enclosure includes a plurality of upright posts interposed between pairs of adjoining screen panels, said screen panels and said posts being joined together by a plurality of fasteners that may be installed by hand without the need of tools.

18. The outdoor fireplace of claim 13, wherein one of said top and bottom fire bowl members includes a manipulatable latch member and the other of said top and bottom fire bowl members includes a hook that is engaged by said latch member to secure said top and bottom fire bowl members together.

19. A collapsible portable outdoor fireplace, comprising:
a base member for supporting and burning a combustible material therein, the base member having an outer edge;
a vertical fire screen assembly supported by said base member near said base member outer edge, said fire screen assembly defining a fire chamber for containing said combustible material within said base member, said fire screen assembly including a plurality of individual screen panels that engage each other to define said fire screen assembly and which are easily detachable therefrom into said individual screen panels;
a cover member for covering said fire screen assembly, the cover member having an outer edge that at least approximates said bottom member outer edge and said cover member being supported by said fire screen assembly;
an undercarriage for supporting said fireplace on the ground, the undercarriage detachably engaging said base member and being formed from interengaging components, such that when said cover and bottom members are placed together in a manner where their respective outer edges mate together, an interior storage space is formed therebetween with sufficient size to store said fire screen panels and said undercarriage components when detached; and,
at least one engagement member for engaging said top and bottom members together proximate to said outer edges thereof to retain said top and bottom members together.

20. A portable outdoor fireplace, comprising:
a base member for supporting and burning combustible material therein, the base member having an outer edge of a predetermined configuration;
a collapsible fire screen structure supported by said base member, said fire screen structure having a vertical configuration when assembled that forms a fire chamber which contains and substantially encloses said combustible material within said base member, said fire screen structure including a plurality of components that are engageable together to cooperatively define said fire screen structure, and which are capable of being collapsed from said vertical configuration into a smaller configuration;

a cover member for covering a top portion of said fire screen structure, said cover member also having an outer edge of the same configuration as that of said base member outer edge, said base and cover members being engageable with each other in a manner such that when their respective outer edges mate together, said base and cover members cooperatively define an interior storage cavity therebetween;

a collapsible undercarriage that supports said base member on the ground, said undercarriage being detachable from said base member; and, said interior storage cavity being of sufficient size for storing both said collapsed fire screen structure and said undercarriage when detached from said base member.

* * * * *